Dec. 11, 1945.  W. E. AKSOMITAS  2,390,910
METHOD OF COOLING GLASS ARTICLES
Filed Jan. 27, 1943
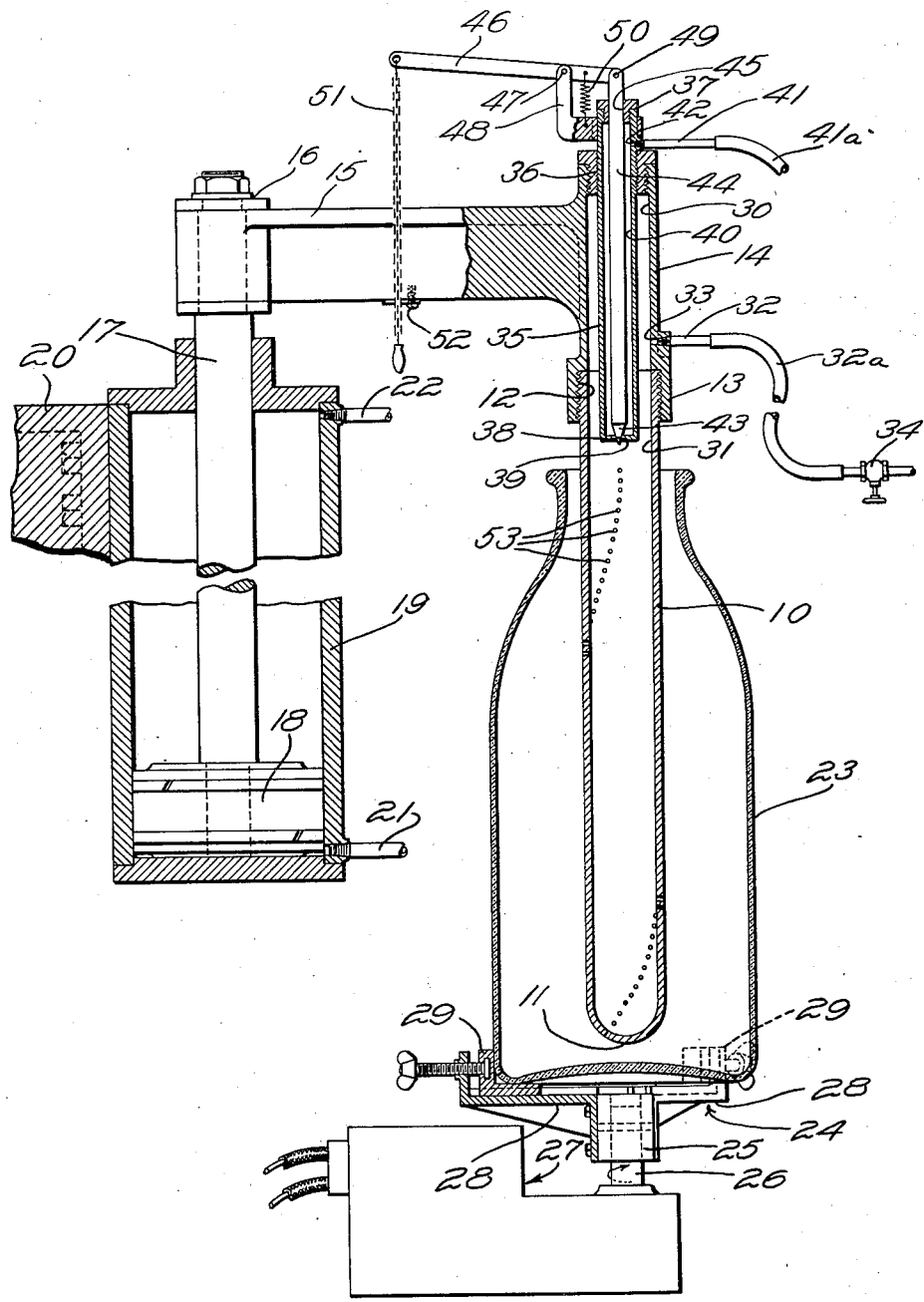
Inventor
William E. Aksomitas
By Brown & Parham
Attorneys Patented Dec. 11, 1945

2,390,910

UNITED STATES PATENT OFFICE 2,390,910

METHOD OF COOLING GLASS ARTICLES

William E. Aksomitas, Hartford, Conn., assignor to Hartford-Empire Company, Hartford, Conn., a corporation of Delaware Application January 27, 1943, Serial No. 473,687

8 Claims. (Cl. 49—89)

This invention relates generally to improvements in methods of cooling glass articles. It relates more particularly to methods of cooling bottles and other hollow glass articles from a temperature well above to a temperature below the strain point of the glass thereof by applying to the surfaces of such articles a cooling fluid of such a character and so applied as to effect tempering of the glass articles.

Compressed air may be used as the cooling fluid to be used in the tempering of bottles and other hollow glass articles. It has been proposed to increase the cooling effect thereof by mixing therewith a liquid, particularly water, so that the cooling fluid applied to the glass articles will be in the form of a spray or mixture of air and water.

A drawback to tempering glass articles by applying a spray or mixture of air and water to the surfaces thereof is that the liquid component tends to form undesirably large liquid masses or drops at various places on the surface to be cooled and may drip uncontrollably from a higher to a lower portion of such surface. This drawback is particularly serious in the cooling of the internal surface of a bottle or other hollow glass article. If, for example, too much water is supplied to or accumulates on a portion of the internal side surface of a bottle, "flaking" or "checking" of the glass at that place may be produced and, furthermore, the excess water may drip downwardly into the bottom portion of the bottle and thus impair the cooling operation there.

An object of the present invention is to obviate or substantially overcome the aforesaid drawback to successful tempering of glass articles, including bottles, by the use of a spray or mixture of air and water or other suitable gas-liquid mixture as the cooling agent. This invention is based on the concept that all the liquid component of such a cooling mixture should be heated to steam or vaporized by contact with the glass surface being cooled and that each particle or portion of the liquid applied to such glass surface should be converted to steam immediately at the spot of impact on that surface. To carry this concept into effect, the invention provides for the production and application of a glass-liquid mixture to the glass surface to be cooled in such a way and by such means that the amount of liquid included in the cooling spray or fluid mixture may be regulated so as to be relatively great at the beginning of the tempering operation—when the temperature of the hot glass surface to be cooled is highest and its vaporizing effect on the liquid coolant is greatest— and sufficiently reduced as the cooling of the glass surface is effected to prevent the accumulation of liquid as such on any portion of the glass surface at any time during the glass cooling operation.

According to one method of the invention, the liquid included in the cooling mixture is sufficient for a maximum cooling effect at the beginning of the glass cooling operation. Thereafter, the amount of liquid mixed with air or other gaseous component of the cooling mixture is gradually reduced in accordance with the reduction of temperature of the glass surface to which the cooling mixture is being applied. In an alternative method, the liquid component of the mixture may be supplied at a predetermined rate for a predetermined time after cooling of a glass surface is commenced, the supply of the liquid component then being shut off and the cooling of the glass surface continued, at least if its temperature is above the strain point of the glass, by the gaseous component alone. If a constant rate of supply of the liquid component is used, the appropriate rate may be determined by a determination of the amount of liquid that will vaporize on contact with the glass surface to be cooled when that surface is at a temperature less than its starting temperature and at which the supply of liquid should be shut off or at least sufficiently reduced. The greater the amount of liquid included in the cooling mixture at the beginning of a cooling operation, the earlier in the cooling operation the supply of liquid included in the mixture should be shut off or reduced. The air or other gaseous component of the mixture may be supplied at a predetermined constant rate or at a rate that is increased as the supply of the liquid component is decreased or when the liquid has been entirely shut off.

Broadly considered, the invention contemplates the cooling of a glass article, such as a bottle, from a predetermined temperature above to a temperature below the strain point of the glass thereof by applying thereto a mixture or spray of two fluid components having different cooling effects, and varying the amounts of such components or of one of them during the continuance of the cooling operation.

The invention also contemplates combining two fluid components of a mixture suitable for application to a hot glass surface, discharging the mixture onto the glass surface and controlling the two fluid components independently so that the amounts thereof comprising the discharging mixture can be varied at will.

Other objects and advantages of the invention will hereinafter become apparent or will be pointed out in connection with the following description of a practical embodiment of the invention, as illustrated in the accompanying drawing in which:

The view shows, mainly in vertical section, a gas-liquid spray device in position for use to effect cooling of the internal surface of a bottle in accordance with the principle of the invention.

As shown in the drawing, a structure adapted for use to effect cooling of the internal surface of a bottle may comprise a tubular nozzle 10. This nozzle is closed at one of its ends, as at 11 and is open at its opposite end. The open end portion of the nozzle may be provided with external screw threads, as at 12, for threaded engagement with an internally screw-threaded lower end portion 13 of a vertically disposed hollow nozzle holding head member 14. The head member 14 may be connected, integrally as shown or otherwise, with an arm 15 which is mounted, as at 16, on the upper end portion of a vertical rod 17. The arrangement is such that the arm 15 extends horizontally from the rod 17 and the nozzle 10 is suspended in a vertical position from the head member 14.

The rod 17 is supported by a piston 18 which is reciprocable in a vertically disposed cylinder 19. The cylinder 19 may be carried by a fixed support 20 so as to be located in a predetermined desirable position. Suitable pipes 21 and 22 may be connected with the lower and upper end portions, respectively, of the cylinder 19. Each of these pipes may constitute a pressure fluid supply and exhaust pipe so that fluid under pressure may be supplied and exhausted alternately to and from each of the opposite ends of the cylinder as required to effect vertical reciprocatory movements of the piston 18 in the cylinder. In order that each of the pipes 21 and 22 may serve as a pressure fluid supply pipe at one time and as an exhaust pipe at another time, such pipe may be provided with any suitable known means, such as an ordinary two-way or vented valve (not shown), so as to adapt the pipe to serve the dual purposes just described. The nozzzle 10 may thus be moved vertically between a raised position, not shown, above an upright bottle 23 on a bottle holder 24 and a lowered position at which the nozzle depends through the open end portion of the bottle within the latter centrally thereof to a predetermined level, which may be near the bottom of the bottle.

The holder 24 may comprise a hub member 25 mounted on an upwardly projecting relatively short driven shaft 26 of a driving mechanism 27. A plurality of arms 28 may extend radially from the hub 25 beneath the bottom of the bottle and be provided at their extremities with clamping devices 29 for engaging the lower portion of the bottle adjacent to its bottom so as to retain it securely in place on the holder. The driving mechanism is shown only diagrammatically as it may be any suitable known device, such as any one of numerous well known commercial combined electric motor and speed reduction units on the market, for rotating the shaft 26 and the holder 24 in the desired direction about the axis of such shaft and at the speed desired. Any other suitable known mechanism, such, for example, as that disclosed in the patent to Mitford, No. 2,269,060, of January 6, 1942, may be used for supporting the bottle or other hollow glass article at the cooling station and for rotating it there about its own axis, if desired.

The nozzle supporting head member 14 has a vertical passage therein, indicated at 30, closed at its top and in open communication at its lower end with the bore or internal space 31 within the nozzle 10. An air supply pipe 32 communicates with the passage 30 through a lateral port 33. The pipe 32 may include a flexible section 32a so as to permit the desired vertical movements of the nozzle and member 14 as a unit. The amount of air permitted to enter the passage 30 from the pipe 32 in a given time may be regulated from a maximum to zero, as by operation of a valve 34.

A tubular member 35 depends within the head member 14 through the passage 30 in spaced relation with the wall of the latter to a level below that of the air inlet port 33 in the side of the head member 14. This may be below the level of the upper end of the nozzle 10 into which the tubular member 35 may depend, as shown. The tubular member 35 may be supported, as at 36, by the structure at the upper end of the tubular head member 14 and may be closed at its upper end at 37 and also at its lower end, as at 38, except for a small central downwardly opening discharge outlet 39. The discharge outlet 39 provides communication between the internal space or passage 40 in the tube 35 and the internal space or bore 31 of the nozzle.

A supply pipe 41 for water or other suitable liquid communicates with the passage 40 of the tubular member 35 through a lateral inlet port 42. The wall of the discharge outlet 39 of the passage 40 constitutes a seat for a needle valve 43 having a stem 44 extending vertically through the passage 40 and slidably through a central opening 45 in the structure at the top of the tubular member 35. A lever 46 is intermediately pivoted on a bracket 48 carried by the tubular member 35 and is pivotally attached at one end, as at 49, to the upper end of the valve stem 44. A tension spring 50 connects the lever 46 with the bracket 48 so as to tend to maintain the valve 43 fully seated against the wall of the outlet 39. A pull chain or cable 51 depends from the outer end of the lever 46 and may be grasped and manipulated to raise the valve 43 more or less from its seat. This pull chain may be engaged at different places along its length with a keeper or retaining device 52 so that the valve may be retained in a predetermined fully or partially open position after the pull chain has been released. The pipe 41 may include a flexible section, included at 41a, so that it will not interfere with the desired vertical movements of the nozzle carrying head member. The location of the valve 43 at the extreme lower end of the liquid supply passage 40 is advantageous in that it assures complete closing of all liquid flow to the interior of the nozzle when the valve 43 has been closed, there being no intervening liquid conducting surface or member between the valve seat and the interior of the nozzle.

The nozzle 10 may be provided with a series of jet holes 53 in the wall thereof for discharging jets of air-water spray or other gaseous fluid-liquid mixture against the internal surface of the bottle 23. These jet holes may be of any predetermined size or sizes and their total number and relative locations longitudinally and circumferentially of the nozzle may be predetermined according to individual preference or to satisfy particular requirements in order best to perform a given glass surface cooling operation. As shown, the jet holes 53 are arranged along a line extending spirally of the nozzle body from the lower end thereof to a level approximating that of the open upper end of the bottle. This arrangement is believed to be suitable for discharging jets of cooling fluid against the internal surface of a bottle substantially like that shown when the bottle is being rotated about its vertical axis in the direction indicated by the arrow on the shaft 26 in the drawing. Other arrangements may be provided for use in other operating set-ups and for different cooling operations.

Assuming that the bottle 23 has been heated to the temperature desired for the beginning of the cooling operation, this temperature being well above that of the strain point of the glass of the bottle and possibly near the softening point thereof, the valves 34 and 43 may be opened to predetermined extents to produce the desired mixture of air and water in the chamber 31 of the nozzle 10. This mixture may be such that the spray discharged through the jet holes 53 against the internal surface of the bottle will include as much water as will vaporize on contact with the hot glass surface at its then temperature at the beginning of the cooling operation. The vaporizing effect of this glass surface will decrease with its temperature so that, to avoid the harmful effects of excess water in the coolant, the valve 43 may be manipulated during the cooling operation so as to be closed gradually, thereby decreasing the water component of the spray. The rate of supply of air may be kept constant or may be increased by manipulation of the valve 34 as the supply of water is decreased or after it has been shut off. The continued flow of cooling air will also serve to scavenge from the nozzle chamber and jet holes any moisture which may tend to cling thereto, thus preparing the apparatus for the next cooling operation.

As an alternative method of using the illustrative device, the valve 43 may be adjusted so as to provide only as much water in the spray as will be vaporized on contact with the hot glass surface of the bottle when such surface is at a predetermined temperature lower than its starting temperature. During the initial part of the cooling operation until the glass surface reaches this lower temperature, the supply of water component of the spray may be kept constant and the water then may be shut off completely before the temperature of the glass has been reduced far enough to cause excess water to injure the glass surface or impair the tempering operation. The air may be supplied at a constant rate or may be increased after the water supply has been shut off.

The invention is not limited to the details of the modes of operation of the illustrative device hereinbefore pointed out as various changes therein and modifications thereof will readily occur to those skilled in the art.

I claim:

1. The method of cooling a hot glass article which comprises applying to said glass article a coolant consisting of gaseous fluid and as much liquid mixed with the gaseous fluid as will vaporize on contact with the hot glass article when said article is at the temperature at which the cooling operation is started and reducing the amount of liquid in said coolant as the temperature of said article is reduced during said cooling operation.

2. The method of tempering a glass article which comprises heating said article to a predetermined temperature above the strain point of the glass thereof, applying to said article a fluid coolant comprising a cooling gas and a predetermined amount of a more vigorous fluid coolant when said article is at said predetermined temperature, and reducing the amount of the more vigorous fluid component of the coolant during the cooling of said article.

3. In a method of treating a hollow glass article, the steps of heating such article to a predetermined temperature, applying to the internal surface of the article a mixture of two different fluids having different cooling values, and stopping the application of one of such fluids to said internal surface while continuing to apply the other fluid thereto.

4. In a method of tempering a hollow glass article, the steps of heating the article to a predetermined temperature above the strain point of the glass thereof, applying to the internal surface of the hollow glass article when it is at said predetermined temperature a mixture of a gaseous fluid under pressure and as much liquid in a finely divided state as will be vaporized on contact with the hot internal surface of the glass article, and continuing to apply said gaseous fluid to said internal surface as the temperature of the latter is lowered from said predetermined temperature while reducing the amount of liquid mixed with said gaseous fluid in accordance with the decreasing vaporizing effect of said internal surface as the temperature thereof is reduced.

5. In a method of tempering a hollow glass article, the steps of heating the glass article to a predetermined temperature above the strain point of the glass thereof, starting the cooling of the internal surface of said article from said predetermined temperature by applying thereto distributed jets of a mixture of air and water, and thereafter, during the operation of cooling said internal surface, reducing the amount of water in said mixture while continuing to supply the air component thereof.

6. In a method of tempering a hollow glass article, the steps of heating said article to a predetermined temperature above the strain point of the glass thereof, starting the cooling of the internal surface of the article from said predetermined temperature to a temperature below said strain point by applying to said surface a mixture of gaseous fluid and liquid and, before said surface has been cooled below said strain point, shutting off the supply of liquid while continuing to supply the air component of said mixture.

7. The method of treating a surface of a glass article which comprises applying to said surface a temperature regulating fluid comprising a mixture of air and a different fluid until said surface has attained a predetermined temperature and then shutting off said different fluid and continuing the application of air alone to said surface until the latter is at a still different temperature.

8. The method of tempering a hollow article of glassware which comprises heating said article to a temperature substantially above that of the strain point of the glass thereof, cooling said article at a surface thereof by applying to said surface jets of a cooling fluid having a relatively high cooling value until the temperature at said surface has been lowered from said predetermined temperature part of the way to said strain point, and then continuing the cooling of said article to a temperature below said strain point by applying to said surface jets of a cooling fluid having a lower cooling value than said first named cooling fluid.

WILLIAM E. AKSOMITAS.